(12) United States Patent
Haziza

(10) Patent No.: US 10,705,391 B2
(45) Date of Patent: Jul. 7, 2020

(54) MULTI-STATE CONTROL OF LIQUID CRYSTALS

(71) Applicant: Wafer LLC, Hanover, NH (US)

(72) Inventor: Dedi David Haziza, Kiryat Motzkin (IL)

(73) Assignee: Wafer LLC, Hanover, NH (US)

( * ) Notice: Subject to any disclaimer, the term of this patent is extended or adjusted under 35 U.S.C. 154(b) by 111 days.

(21) Appl. No.: 16/116,738

(22) Filed: Aug. 29, 2018

(65) Prior Publication Data

US 2019/0064609 A1 Feb. 28, 2019

Related U.S. Application Data

(60) Provisional application No. 62/552,273, filed on Aug. 30, 2017.

(51) Int. Cl.
*H01Q 3/44* (2006.01)
*G02F 1/1343* (2006.01)
(Continued)

(52) U.S. Cl.
CPC ...... *G02F 1/134309* (2013.01); *G02F 1/1343* (2013.01); *G09G 3/36* (2013.01);
(Continued)

(58) Field of Classification Search
CPC .......... H01Q 1/44; H01Q 9/0421; H01Q 3/44; G02F 1/134309; G02F 1/1343; G09G 3/3648; G09G 2300/0426; G09G 3/36
(Continued)

(56) References Cited

U.S. PATENT DOCUMENTS

| 3,887,925 A | 6/1975 | Ranghelli et al. |
| 5,394,119 A | 2/1995 | Pleva et al. |

(Continued)

FOREIGN PATENT DOCUMENTS

| JP | 2000-236207 A | 8/2000 |
| JP | 2000-315902 A | 11/2000 |

(Continued)

OTHER PUBLICATIONS

Dolfi, D., et al., "Liquid Crystal Microwave Phase Shifter," Electronics Letters, vol. 29, No. 10, May 13, 1993.
(Continued)

*Primary Examiner* — Hai V Tran
(74) *Attorney, Agent, or Firm* — Womble Bond Dickinson (US) LLP; Joseph Bach, Esq.

(57) ABSTRACT

A multi-state variable dielectric antenna, comprising: a top dielectric; a bottom dielectric; a variable dielectric plate between the top dielectric and the bottom dielectric; a plurality of conductive devices provided over the variable dielectric plate; an RF feed provided below the bottom dielectric; wherein the variable dielectric plate comprises: a top binder; a bottom binder; variable dielectric constant material provided between the top binder and bottom binder, the variable dielectric constant material divided into pixels, each pixel located below a corresponding conductive device and having a plurality of electrodes; a plurality of conductive lines, each conductive line connected independently to one of the electrodes and to a controller, such that each of the plurality of electrodes of a single pixel independently receives an activation signal from the controller.

19 Claims, 3 Drawing Sheets

(51) Int. Cl.
*G09G 3/36* (2006.01)
*H01Q 1/44* (2006.01)
*H01Q 9/04* (2006.01)

(52) U.S. Cl.
CPC ............ *G09G 3/3648* (2013.01); *H01Q 1/44* (2013.01); *H01Q 3/44* (2013.01); *H01Q 9/0421* (2013.01); *G09G 2300/0426* (2013.01)

(58) Field of Classification Search
USPC .................................................. 343/700 MS
See application file for complete search history.

(56) References Cited

U.S. PATENT DOCUMENTS

| | | | |
|---|---|---|---|
| 6,335,699 B1 | 1/2002 | Honma | |
| 2008/0036664 A1* | 2/2008 | Haziza | ..................... H01Q 3/36 343/700 MS |
| 2009/0091500 A1 | 4/2009 | Haziza | |
| 2009/0278744 A1* | 11/2009 | Kirino | ..................... H01P 1/184 343/700 MS |
| 2014/0266897 A1 | 9/2014 | Jakoby et al. | |
| 2018/0062266 A1* | 3/2018 | Haziza | ................. H04B 7/0413 |
| 2018/0062268 A1 | 3/2018 | Haziza | |
| 2018/0062272 A1* | 3/2018 | Haziza | .................. H01Q 25/00 |
| 2018/0159213 A1* | 6/2018 | Haziza | ................. H01Q 21/065 |

FOREIGN PATENT DOCUMENTS

| | | |
|---|---|---|
| JP | 2003-017912 A | 1/2003 |
| JP | 2004-023228 A | 1/2004 |

OTHER PUBLICATIONS

International Preliminary Report on Patentability dated Mar. 3, 2020, for PCT/US.2018/048974, filed Aug. 30, 2018, 9 pages.

\* cited by examiner

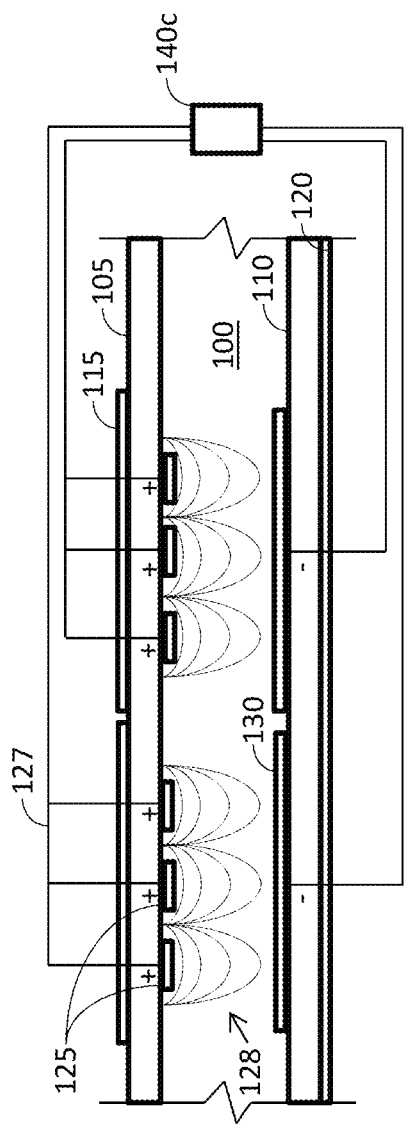
Figure 1 – Prior Art
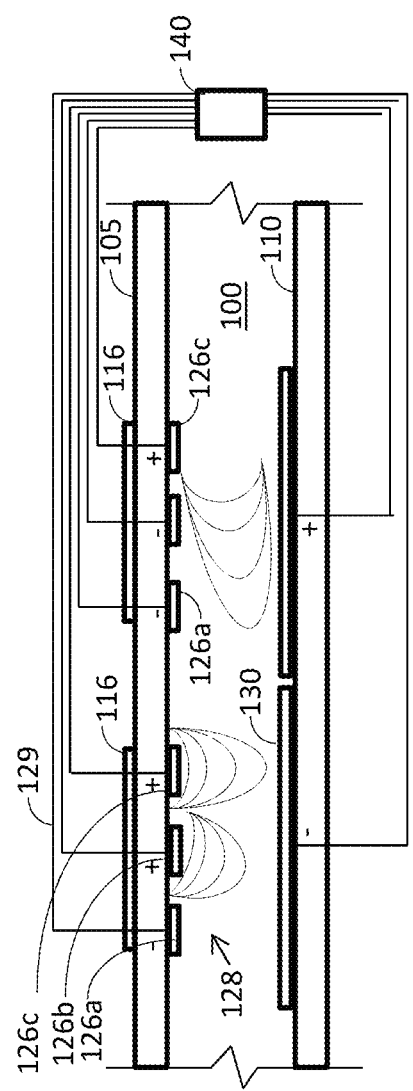
Figure 2

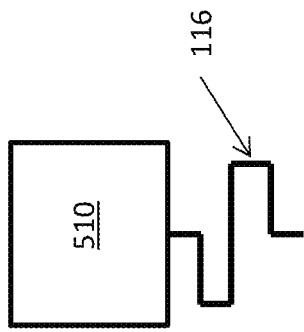

MULTI-STATE CONTROL OF LIQUID CRYSTALS

CROSS-REFERENCE TO RELATED APPLICATION

This application claims priority from U.S. Provisional Application No. 62/552,273, filed Aug. 30, 2017, the disclosure of which is incorporated herein by reference in its entirety.

BACKGROUND

1. Field

This disclosure relates generally to the field of liquid crystal devices and, specifically, to the control of liquid crystal domain orientation.

2. Related Art

Liquid crystals can be used in a variety of applications. A feature of liquid crystals is that external perturbation can cause significant changes in the macroscopic properties of the liquid crystal system. These changes in the macroscopic properties can be used in optical and electrical systems, to name just two. Both electric and magnetic fields can be used to induce these changes. The magnitudes of the fields, as well as the speed at which the molecules align are important characteristics for specific applications.

Special surface treatments can be used in liquid crystal devices to force specific orientations of the dipole molecules, thus orienting the director. The ability of the director to align along an external field is caused by the electric nature of the molecules. In this respect, the director refers to a dimensionless unit vector n that represents the direction of preferred orientation of the molecules in the neighborhood of any point. Permanent electric dipoles result when one end of a molecule has a net positive charge while the other end has a net negative charge. When an external electric field is applied to the liquid crystal, the dipole molecules tend to orient themselves along the direction of the field.

In general systems, the molecules are aligned in one direction at the relax state, i.e., no external field applied. When a change is needed, an appropriate electrical field is applied, which causes the molecules to rotate an amount that correlates with the strength of the applied field. When the effect is no longer required, the field is removed and the molecules return to their relaxed state. The two actions can be thought of as electrical and chemical reactions: when a field is applied, an electrical reaction occurs to rotate the molecules, and when the field is removed, a chemical reaction returns the molecules to their relaxed state. However, the electrical reaction occurs much faster than the chemical reaction. Thus, the temporal operations are not symmetrical—the "turning on" being much faster than the "turning off".

In optical systems, such as LCD displays, this asymmetrical phenomenon is actually advantageous, as it maintains a smooth and acceptable image even when the refresh rate is relatively slow. When the potential is applied to an electrode to "turn on" a pixel, the director change orientation rapidly and light is allowed to pass to illuminate the pixel to the desired intensity. As scanning proceeds to other pixels, the potential is not applied to the pixel until next cycle in the refresh sequence. However, light can still pass through, as the relaxation of the director takes longer time, such that before it is turned totally off, the next refresh cycle applied the potential again and maintains a smooth image, as the human eye cannot see the small drop in intensity.

For more information on using electrodes to control the orientation of liquid crystals the reader is directed to, e.g., U.S. Pat. Nos. 5,105,186 and 8,111,232 and to U.S. Patent Publication 2008/0024688. These arts relate to the traditional use of nematic phase liquid crystals for flat panel displays.

Recently, Applicant has proposed using liquid crystals for controlling the characteristics and operation of non-optical devices. Examples can be seen in U.S. Pat. Nos. 7,466,269 and 7,884,766, and Publication No. 2018-0062238. In such devices, the orientation of the director is controlled in order to change the dielectric constant of the liquid crystal layer, thereby changing the operational characteristics of electrical devices. However, as discovered by the subject inventor, in opposite to the conventional art, the asymmetric operation of liquid crystals is undesirable for such applications. The subject inventor has determined that when controlling the operation of electrical devices, it is desirable to have the "turn off" process to be as fast as the "turn on" process.

Accordingly, a need exists in the art for improved control of the director in liquid crystals.

SUMMARY

The following summary of the disclosure is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Disclosed embodiments provide an improved control of the orientation of liquid crystal domains. The disclosed embodiments utilize plurality of electrodes each having independent control line to enable rapid placement of the domain system in a desired state.

In general aspects, a liquid crystal system is fabricated, having a plurality of groups of pixels, each group operable to control the operational characteristics of an electrical device. Each group comprises a plurality of pixels, wherein each pixel includes a plurality of electrodes arranged spatially to generate a plurality of electrical field states, having different spatial orientation. Each state is configured to place the liquid crystal domains within the pixel in a different desired orientation.

In disclosed embodiments, the liquid crystal material is sandwiched between top and bottom dielectric plates, such as glass, PET, Teflon, etc. For each defined pixel, a plurality of top electrodes is provided on the top dielectric, and at least one electrode is provided on the bottom dielectric. Each of the top and bottom electrodes is connected to an individual control line that can be independently energized to any polarization by the controller. By applying different potentials at different polarizations to the individual electrodes, various modes, or states, can be defined within the liquid crystal system. The direction and amplitude of the director can be controlled by the magnitude of the applied potential and the selection of the electrodes to which the potential is applied.

According to an aspect, a multi-state variable dielectric antenna is provided, comprising: a top dielectric; a bottom dielectric; a variable dielectric plate between the top dielectric and the bottom dielectric; a plurality of conductive devices provided over the variable dielectric plate; an RF feed provided below the bottom dielectric; wherein the variable dielectric plate comprises: a top binder; a bottom binder; variable dielectric constant material provided between the top binder and bottom binder, the variable dielectric constant material divided into pixels, each pixel located below a corresponding conductive device and having a plurality of electrodes; a plurality of conductive lines, each conductive line connected independently to one of the electrodes and to a controller, such that each of the plurality of electrodes of a single pixel independently receives an activation signal from the controller.

The multi-state variable dielectric antenna may further comprise: a plurality of radiating patches provided over the top dielectric; a plurality of conductive vias, each providing electrical connection between one of the conductive devices and a corresponding one of the radiating patches. The antenna may also further comprise: an RF ground having a plurality of windows, each window being aligned below one of the radiating patches. The plurality of conductive lines can include conductive lines connected independently to each one of the radiating patches and to the controller, such that each of the plurality of radiating patches independently receives an activation signal from the controller. The variable dielectric plate may further comprise a plurality of spacer provided between the top binder and bottom binder. The variable dielectric plate may further comprise a plurality of ground electrodes for each pixel. The variable dielectric plate may further comprise a plurality of ground lines, each ground line connected independently to one of the ground electrodes and to the controller, such that each of the plurality of ground electrodes of a single pixel independently receives an activation signal from the controller. Additionally, each of the plurality of conductive devices may comprise a delay line configured for transmitting RF signal to a radiating patch and may be configured to receive an RF signal from a radiating patch and a pixel activation signal from the controller. The antenna may include an arrangement of a DC open and an RF short between the RF feed and the plurality of conductive devices. Each of the plurality of conductive devices may comprise a delay line formed as a meandering conductive strip, and wherein several of the pixels are arranged along the meandering conductive strip. A plurality of RF radiating patches may be included, wherein each of the delay lines is connected to one of the RF radiating patches. The antenna may further comprise a plurality of ground electrode positioned below each pixel, and a plurality of grounding signal lines each connected individually and exclusively to one of the ground electrodes and leading to the controller.

According to further aspects, a method for fabricating a multi-state variable dielectric antenna is provided, comprising: placing variable dielectric constant material between a top binder and a bottom binder; forming pixels of the variable dielectric constant material; forming a plurality of electrodes on the top binder, wherein a subset of more than one of the plurality of electrodes is provided over each pixel; forming a plurality of signal lines, each signal line connected independently and exclusively to only one of the plurality of electrodes, and leads to a controller; forming a ground arrangement on the bottom binder; forming a plurality of conductive devices over the top binder, wherein at least one of the pixels is situated below each of the conductive devices. Forming the ground arrangement may comprise forming a plurality of ground electrode below each pixel, and forming a plurality of grounding signal lines each connected individually and exclusively to one of the ground electrodes and leading to the controller. Forming the plurality of conductive devices may comprise forming a plurality of meandering conductive lines, each of the meandering conductive lines being formed over multiple pixels. The method may further comprise forming a plurality of radiating patches and forming a plurality of contacts, each contact connecting one of the radiating patches to one of the meandering conductive lines.

BRIEF DESCRIPTION OF THE DRAWINGS

Other aspects and features of the invention would be apparent from the detailed description, which is made with reference to the following drawings. It should be appreciated that the detailed description and the drawings provides various non-limiting examples of various embodiments of the invention, which is defined by the appended claims.

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 1 illustrates a liquid crystal structure according to the prior art.

FIG. 2 illustrates a liquid crystal structure according to one embodiment of the invention.

FIGS. 5A and 5B illustrate an example of an electronic device according to one embodiment.

DETAILED DESCRIPTION

Figure 3:
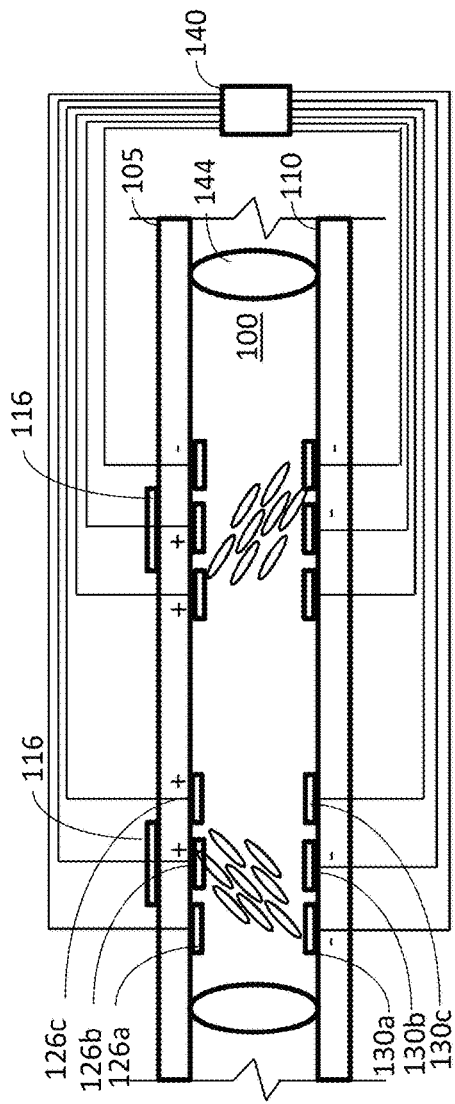
FIG. 3 illustrates a liquid crystal structure according to another embodiment of the invention.

Embodiments of the inventive liquid crystal structure and its operation will now be described with reference to the drawings. Different embodiments or their combinations may be used for different applications or to achieve different benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

It should be noted that in the Figures representations of fields or directors are given. These representations correlate to particular instance in time and can be changed by applying different potentials, as will be explained more completely below.

FIG. 1 illustrates a partial cross-section of a liquid crystal structure according to the prior art. The liquid crystal material 100, e.g., nematic phase liquid crystals, is sandwiched between a top dielectric 105 and a bottom dielectric 110. A color filter 115 is provided on the top dielectric 105 and an illumination layer 120 is provided on the bottom dielectric 110. The orientation of the director in each pixel (two pixels shown in FIG. 1) is controlled by applying voltage potential to the upper electrodes 125 and bottom electrode 130, made of conductive material. The upper electrodes 125 need to be transparent to the user and, therefore, for each pixel the upper electrode is made of three thin strips of transparent conductive, such as ITO. The three strips are then connected to a single transverse conductive strip, such that all three are maintained at the same potential at all times. Since in the cross-section of FIG. 1 the transverse strip cannot be shown, it is simulated by the three conductor lines 127, which connect the strips to the controller 140. That is, the signal from the controller is applied to the three strips simultaneously via the transverse strip to generate the uniform field shown at 128. The bottom electrode 120 can be made as one large plate and also has one signal line leading to the controller. The field 128 is generated due to the potential difference between the three strips 125 and the bottom electrode 130. Since all of the three strips are held at the same potential, the field direction is uniform and does not change, but its magnitude can be changed by the magnitude of the potential applied to the electrodes.

The considerations for electronic devices are different from those for optical devices, such as LCD. For example, for electronic devices it does not matter whether the electrodes are optically transparent. Also, although changing the magnitude of the field is important for electronic devices as well, the subject inventor has determined that it is also important to control the direction and/or shape of the field, and the speed at which the field changes. The following embodiments provide the ability to change the direction and shape of the field in addition to its magnitude.

FIG. 2 illustrates an embodiment enabling control over the direction and shape of the field in addition to its magnitude. As in FIG. 1, the liquid crystals 100 are sandwiched between the top dielectric 105 and bottom dielectric 110. For the electronic device there's no need for the color filter. Instead, an electronic device, in the form of a conductive circuit 116, e.g., delay line, radiating patch, etc., is provided on the top dielectric 105. Also, illumination 120 is not needed and is eliminated. In FIG. 2 the bottom electrodes 130 may be maintained the same as with FIG. 1. Conversely, the top electrodes for each pixel are modified to provide a plurality (here three) of individually controlled electrodes 126a-126c. Each of the individually controlled top electrodes 126a-126c within one pixel is connected individually to the controller 140. By having the controller apply different potential at different polarity to the electrodes 126a-126c, the direction and shape of the field 128 can be changed, as exemplified in FIG. 2.

As an example, in FIG. 2 the controller applies different signals to the two pixels. For the pixel on the left, the controller applies ground signal to the bottom electrode 130, and also to the left-most top electrode 126a. Consequently, the generated field is skewed as compared with the conventional uniform field illustrated in FIG. 1. To be sure, since the drawings presented herein were not made by a simulation program, the fields are shown schematically and are not an accurate representation of the actually resulting field. As noted, the magnitude of the field is controlled by the magnitude of the positive potential applied to electrodes 126b and 126c.

Also, in FIG. 2, for the right pixel the controller applies a positive potential only to the right-most top electrode 126c, while all other electrodes receive the ground potential. In this manner the controller enhances the skew of the field, as schematically illustrated in FIG. 2. Thus, the control schemes disclosed herein enable generating fields not possible with the standard LCD control schemes.

It should be appreciated that the control schemes disclosed herein necessitate many more lines than conventional LCD control schemes. However, since none of the lines and electrodes needs to be transparent, they can be made from aluminum or copper, thereby providing improved conductance compared to an ITO.

FIG. 3 illustrates an embodiment wherein multiple top electrodes 126a-126c and multiple bottom electrodes 130a-130c are provided for each pixel. Each of the top electrodes 126a-126c and bottom electrodes 130a-130c is connected independently and separately to the controller, such that the controller can apply activation signal to each electrode separately. To be sure, in order to generate a specific field, not all of the electrodes need to be energized. This is exemplified in the particular diagram of FIG. 3, but may be applicable to any other embodiment or implementation.

In the situation illustrated in FIG. 3, the left pixel is energized to generate a different field from the right pixel. In the left pixel, the controller applies a negative or ground potential to bottom electrodes 130a and 130b, but applies no potential to bottom electrode 130c, i.e., it remains floating. The controller applies a positive potential to top electrodes 126b and 126c, but no potential to top electrode 126a. Again the resulting field is skewed as compared to that of the conventional LCD. For the pixel on the right, the controller applies negative or ground potential to the two bottom electrodes 130b and 130c and to the top electrode 126c. The controller applies positive potential to top electrodes 126a and 126b, and leaves bottom electrode 130a floating. The resulting field is skewed as compared to that of the conventional LCD.

The embodiment of FIG. 3 also illustrates the use of spacers 144. For electronic devices the distance between the top and bottom dielectric affects the performance of the device and should be kept precise. Therefore, in the embodiment of FIG. 3 insulating spacers, e.g., glass beads, are used to maintain the separation between the top and bottom dielectric precise and uniform throughout the device.

Figure 4:
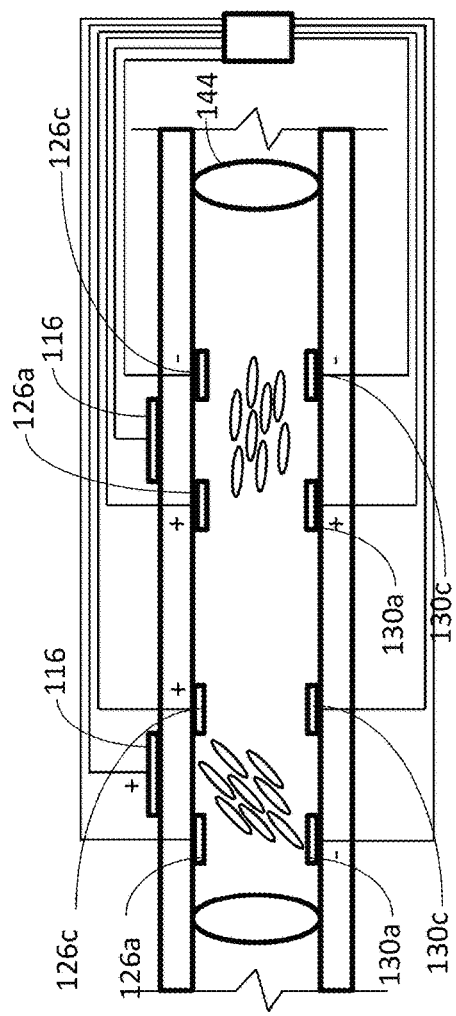
FIG. 4 illustrates a liquid crystal structure according to another embodiment of the invention wherein a conductive patch is used as an electrode.

FIG. 4 illustrates another embodiment. In FIG. 4 each pixel has two upper electrodes 126a and 126c, while at the bottom there may be one overall ground electrode, or several electrode—in this particular example two bottom electrodes 130a and 130c, each connected independently to the controller 140. Additionally, each of the electronic devices in the form of conductive patch 116 is also connected to the controller and receives activation signal. Thus, each of the electronic devices 116 also functions as an activation electrode, in addition to its function as an electronic device, such as a delay line, radiating patch, etc.

In the particular activation moment shown in FIG. 4, the left pixel has a field created by the controller 140 applying positive potential to top electrode 126c and to the conductive patch 116. The controller applies a negative or ground potential to bottom electrode 130a, but maintains top electrode 126a and bottom electrode 130c floating. For the right pixel the controller is shown applying positive potential to top electrode 126a and bottom electrode 130a, applies no potential to the conductive patch 116, and applies ground or negative potential to top electrode 126c and bottom electrode 130c. Thus, as demonstrated herein, the disclosed embodiments enable multi-state control of liquid crystal system.

The different states of the liquid crystal system present different dielectric constant to the conductive patch positioned above the pixel. By changing the dielectric constant in the pixel below the conductive patch, the operational characteristics of the conductive patch can be changed. For example, when the conductive patch is a delay line, changing the state of the liquid crystals of the pixels would change the dielectric constant, thereby changing the amount of delay caused by the delay line. Since the different states are controlled electronically by applying different fields, and without resorting to chemical relaxation of the system, the amount of delay can be controlled rapidly. In this manner, the delay line can be used, e.g., to control phase change in the signal traveling through the conductive patch.

Similarly, when the conductive patch is a radiating patch, changing the state of the liquid crystal can be used to control the resonance frequency of the conductive patch. By having the rapid control using the controller, the resonance can be changed rapidly, such that the radiating patch can be operating in multiple frequencies is succession.

FIGS. 5A and 5B illustrate an example of using the embodiment of FIG. 3 in an electronic device—here an electronically scanned antenna. The example of a radiating device made using the innovative multi-state controlled dielectric which is shown in FIGS. 5A-5B utilizes the multi-layered software defined antenna disclosed by the subject inventor in U.S. patent application Ser. No. 15/654,643, which is incorporated herein by reference. Thus, only relevant parts relating to the disclosed embodiment will be repeated herein. FIG. 5B is a cross-section of part of the antenna showing two radiating patches, while FIG. 5A is a top view of an example of one radiating patch of a multi-layered software defined antenna.

In the embodiment of FIGS. 5A and 5B the electronic device affected by changes in the liquid crystals is delay line 116. The delay line 116 conducts signal to radiating patch 510 through via 525. The radiating patch 510 is formed on a top dielectric spacer 500, which can be generally in the form of a dielectric (insulating) plate or a dielectric sheet such as glass, PET, Rogers®, Rohacell, etc. The radiating patch 510 is formed on the top surface of the spacer 500 by, e.g., adhering a conductive film, sputtering, printing, etc.

At the patch 510 location, a via 525 is formed in the spacer 500, and a conductor is passed through the via and is connected to the back surface of the patch 510. The delay line 116 is formed, e.g., on the bottom surface of spacer 500 (or on top surface of top dielectric 105), and is connected physically and electrically to the conductor in via 525. The delay line 116 is a meandering conductive line made, e.g., by adhering a conductive film, sputtering conductive material, printing, etc., and is passing over liquid crystal pixels. By applying potentials to the top and bottom electrodes of the pixels, as disclosed herein, a delay in the transmission of the signal through the delay line can be induced. The delay can be used, e.g., to change the phase of the signal, thus leading to scanning an antenna array, changing polarization, etc.

The delay in the delay line 116 is controlled by the variable dielectric constant (VDC) plate 540 constructed according to any of the embodiments disclosed herein. While any manner for constructing the VDC plate 440 may be suitable for use with the embodiments of the antenna, as a shorthand in the specific embodiments the VDC plate 440 is shown consisting of upper binder 105, (e.g., glass, PET, etc.) variable dielectric constant material 100 (e.g., twisted nematic liquid crystal layer), and bottom binder 110. In other embodiments one or both of the binder layers 105 and 110 may be omitted. Also, glass beads 144 may be used to ensure accurate spacing of the binders.

In some embodiments, e.g., when using twisted nematic liquid crystal layer, the VDC plate 540 also includes an alignment layer (too thin to be shown) that may be deposited and/or glued onto the bottom of the upper binder 105. The alignment layer may be a thin layer of material, such as polyimide-based PVA, that is being rubbed or cured with UV radiation in order to align the molecules of the LC at the edges of confining substrates.

The effective dielectric constant of each pixel in VDC plate 540 can be controlled by applying voltage potential across the VDC plate 540. For that purpose, upper and lower electrodes are formed and are connected to controllable voltage supply 140. There are various arrangements to form the electrodes, as shown in the above disclosed embodiments. In the arrangement shown in FIG. 4B, for each pixel a plurality of top electrodes 126 and bottom electrodes 130 are provided. Each of the top and bottom electrodes is independently connected to variable voltage supply 140.

Thus, by changing the output voltage applied to each individual electrode by controller 140, one can change the dielectric constant of the VDC material in the vicinity of any individual electrode, and thereby change the RF signal traveling over delay line 116. A conventional controller can be used to provide the control signals to control the characteristics of the antenna, but it must be modified to apply signal to individual electrodes within each pixel. Thus, the antenna's performance and characteristics can be controlled using software—hence software controlled antenna.

At this point it should be clarified that in the subject description the use of the term ground refers to both the generally acceptable ground potential, i.e., earth potential, and also to a common or reference potential, which may be a set potential or a floating potential. For example, conventional LCD display controllers output two signals per pixel, one of which is referred to as the ground or common signal. Similarly, while in the drawings the symbol for negative potential and ground are used, they are used as shorthand to signify either an earth or a common or negative potential, interchangeably. Thus, whenever the term ground is used herein, the term common or reference potential, which may be set or floating potential, is included therein.

In transmission mode the RF signal is applied to the feed patch 560 via connector 546 (e.g., a coaxial cable connector). As shown in FIG. 5B, there is no electrical DC connection between the feed patch 560 and the delay line 116. However, in disclosed embodiments the layers are designed such that an RF short is provided between the feed patch 560 and delay line 116. As illustrated in FIG. 4B, a back plane conductive ground (or common) 555 is formed on the top surface of backplane insulator (or dielectric) 454 or the bottom surface of bottom binder 110. The back plane conductive ground 555 is generally a layer of conductor covering the entire area of the antenna array. At each RF feed location, a window (DC break) 553 is provided in the back plane conductive ground 555. The RF signal travels from the feed patch 560, via the window 553, and is coupled to the delay line 116. The reverse happens during reception. Thus, a DC open and an RF short are formed between delay line 116 and feed patch 560.

According to one embodiment, a method for fabricating a multi-state variable dielectric antenna is provided. The method comprises the steps of placing variable dielectric constant material, such as liquid crystal material 100, between a top binder 105 and a bottom binder 110, and then forming pixels of the variable dielectric constant material. The pixels may be formed by making physical separation or barriers inside the LC material, or by simply defining the location of the activation electrodes 126. Forming the plurality of activation electrodes on the top binder may be done by, e.g., forming copper or aluminum lines, wherein a subset of more than one of the plurality of electrodes is provided over each pixel. Also, as shown in the Figures, the electrodes 126 can be formed on the top or bottom surface of the top binder. Forming a plurality of signal lines (indicated by 117 in FIG. 5B) can be done integrally or separate from the formation of the electrodes 126. Regardless of method of formation, each signal line is connected independently and exclusively to only one of the plurality of electrodes, and leads to the controller 140. Forming a ground arrangement below on the bottom binder can be done by having one or more ground electrodes for each pixel, as shown in the Figures. Also, as shown in the Figures the ground arrangement can be formed using copper or aluminum electrodes on the top or bottom surface of the bottom binder. Regardless of the number of ground electrodes formed for each pixel, a plurality of ground signal lines 118 are formed, each connected independently and exclusively to only one of the plurality of ground electrodes, and leads to the controller 140. A plurality of conductive devices is formed over the top binder, wherein at least one of the pixels is situated below each of the conductive strips. The conductive devices may refer to, delay lines 116 formed over insulator 505, to radiating patch 510 formed over insulator 500, etc. Having at least one pixel below the conductive devices, whether delay line 116 or radiating patch 510, enables controlling the operational characteristics of the conductive device using software executed by the controller 140.

As shown in FIG. 5B, the method proceeds by forming a ground plane 555 over insulator 507. The ground plane 555 forms the ground reference for the RF signal traveling in the conductive device. In the embodiment of FIG. 5B, there is no resistive connection for the RF signal to travel onto the conductive device. Rather, the RF signal is coupled capacitively. This is done by forming a resistive open—RF short between the conductive device and the feed line 546. The resistive open—RF short is formed by making a window 553 in the ground plane at a location aligned directly below the conductive device to be fed. In the example of FIG. 5B, one window 553 is formed directly under each of the delay lines 116. Then a feed patch 560 is formed on insulator 454 in alignment with the window 553, such that the RF signal is capacitively coupled to the delay line 116 through the window 553, without having resistive connection therebetween. The RF signal is coupled to the feed line 560 by coaxial connector 546.

The drawing of FIG. 5B has been simplified to illustrate only one pixel 202 under each delay line 116. This is done for clarity and ease of understanding of the description. However, in practice each delay line may have several pixels, positioned along its length and width, wherein each pixel can be controlled independently as shown herein, to thereby achieve the desired operational characteristics of the delay line at any time. To achieve higher levels of delay, the delay line is formed as a meandering line, as shown in FIG. 5A, such that many pixels can be formed along it length to change the dielectric constant under much of the length of the delay line.

It should be also noted that in some embodiments the ground electrodes 130 can be eliminated and the ground plane 555 can be used as the ground reference for the pixel activation signals as well. However, such an implementation would reduce the number of states available for controlling the individual pixels and may diminish somewhat the benefits of the disclosed invention.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. A multi-state variable dielectric antenna, comprising:
   a top dielectric;
   a bottom dielectric;
   a variable dielectric plate between the top dielectric and the bottom dielectric;
   a plurality of conductive devices provided over the variable dielectric plate;
   an RF feed provided below the bottom dielectric;
   wherein the variable dielectric plate comprises:
      a top binder;
      a bottom binder;
      variable dielectric constant material provided between the top binder and bottom binder, the variable dielectric constant material divided into pixels, each pixel located below a corresponding conductive device and having a plurality of electrodes;
      a plurality of conductive lines, each conductive line connected independently to one of the electrodes and to a controller, such that each of the plurality of electrodes of a single pixel independently receives an activation signal from the controller.

2. The multi-state variable dielectric antenna of claim 1, further comprising:
   a plurality of radiating patches provided over the top dielectric;
   a plurality of conductive vias, each providing electrical connection between one of the conductive devices and a corresponding one of the radiating patches.

3. The multi-state variable dielectric antenna of claim 2, further comprising:
   an RF ground having a plurality of windows, each window being aligned below one of the radiating patches.

4. The multi-state variable dielectric antenna of claim 2, wherein:
   the plurality of conductive lines include conductive lines connected independently to each one of the radiating patches and to the controller, such that each of the plurality of radiating patches independently receives an activation signal from the controller.

5. The multi-state variable dielectric antenna of claim 1, wherein the variable dielectric plate further comprises a plurality of spacer provided between the top binder and bottom binder.

6. The multi-state variable dielectric antenna of claim 1, wherein the variable dielectric plate further comprises a plurality of ground electrodes for each pixel.

7. The multi-state variable dielectric antenna of claim 6, wherein the variable dielectric plate further comprises a plurality of ground lines, each ground line connected independently to one of the ground electrodes and to the controller, such that each of the plurality of ground electrodes of a single pixel independently receives an activation signal from the controller.

8. The multi-state variable dielectric antenna of claim 1, wherein each of the plurality of conductive devices comprises a delay line configured for transmitting RF signal to a radiating patch.

9. The multi-state variable dielectric antenna of claim 1, wherein each of the plurality of conductive devices is configured to receive an RF signal from a radiating patch and a pixel activation signal from the controller.

10. The multi-state variable dielectric antenna of claim 1, further comprising a DC open and an RF short between the RF feed and the plurality of conductive devices.

11. The multi-state variable dielectric antenna of claim 1, wherein each of the plurality of conductive devices comprises a delay line formed as a meandering conductive strip, and wherein several of the pixels are arranged along the meandering conductive strip.

12. The multi-state variable dielectric antenna of claim 11, further comprising a plurality of RF radiating patches, wherein each of the delay lines is connected to one of the RF radiating patches.

13. The multi-state variable dielectric antenna of claim 11, further comprising a plurality of ground electrode positioned below each pixel, and a plurality of grounding signal lines each connected individually and exclusively to one of the ground electrodes and leading to the controller.

14. A method for fabricating a multi-state variable dielectric antenna, comprising:
 placing variable dielectric constant material between a top binder and a bottom binder;
 forming pixels of the variable dielectric constant material;
 forming a plurality of electrodes on the top binder, wherein a subset of more than one of the plurality of electrodes is provided over each pixel;
 forming a plurality of signal lines, each signal line connected independently and exclusively to only one of the plurality of electrodes, and leads to a controller;
 forming a ground arrangement on the bottom binder;
 forming a plurality of conductive devices over the top binder, wherein at least one of the pixels is situated below each of the conductive devices.

15. The method of claim 14, wherein forming the ground arrangement comprises forming a plurality of ground electrode below each pixel, and forming a plurality of grounding signal lines each connected individually and exclusively to one of the ground electrodes and leading to the controller.

16. The method of claim 14, wherein forming the plurality of conductive devices comprises forming a plurality of meandering conductive lines, each of the meandering conductive lines being formed over multiple pixels.

17. The method of claim 16, further comprising forming a plurality of radiating patches and forming a plurality of contacts, each contact connecting one of the radiating patches to one of the meandering conductive lines.

18. The method of claim 14, further comprising placing a plurality of insulating spacers between the top binder and the bottom binder.

19. The method of claim 14, further comprising placing an insulating plate below the bottom binder and forming an RF ground plane on the insulating plate.

* * * * *